Figure 1:
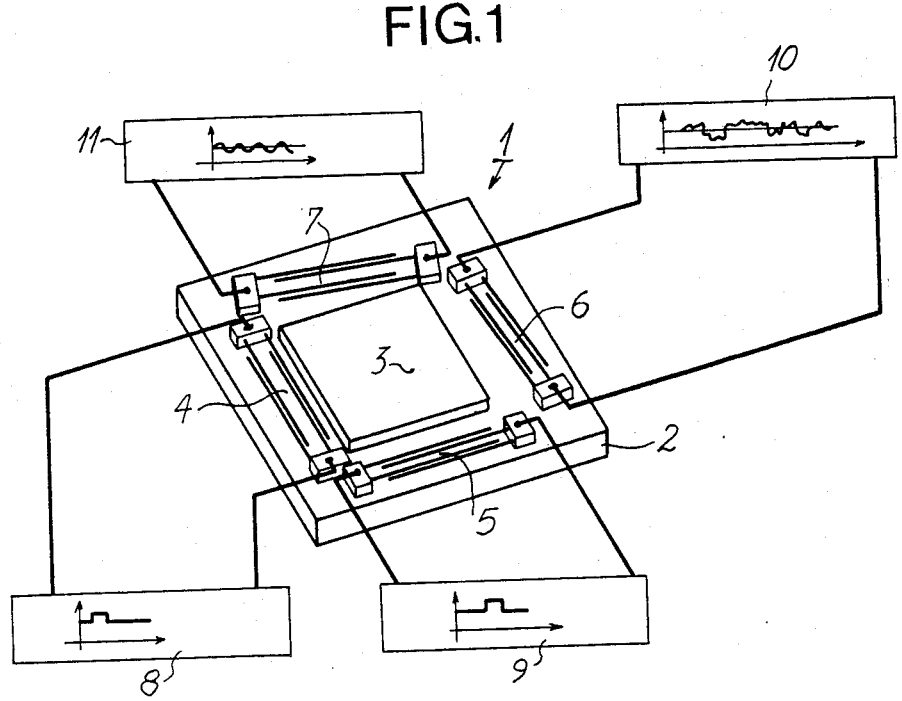

United States Patent [19]

Feldmann et al.

[11] Patent Number: 4,654,715
[45] Date of Patent: Mar. 31, 1987

[54] FLAT SCREEN DISPLAY SYSTEM USING A TWO-DIMENSION SURFACE ACOUSTIC WAVE (SAW) SCANNING

[76] Inventors: Michel Feldmann, 45, rue Saint Lambert, F-75015 Paris; Jeannine Le Goff épouse Henaff, 3ter, Place Marquis, F-92140 Clamart, both of France

[21] Appl. No.: 550,721

[22] Filed: Nov. 14, 1983

Related U.S. Application Data

[63] Continuation of Ser. No. 277,212, Jun. 25, 1981, abandoned.

[30] Foreign Application Priority Data

Jul. 10, 1980 [FR] France ............................. 80 15736

[51] Int. Cl.$^4$ ............................................. H04N 5/70
[52] U.S. Cl. ........................................ 358/230; 358/59; 358/241; 313/508; 340/781
[58] Field of Search .................... 358/56, 59, 213, 230, 358/241; 340/781; 310/313 B; 313/508; 315/169.3

[56] References Cited

U.S. PATENT DOCUMENTS

| | | | |
|---|---|---|---|
| 3,121,824 | 2/1964 | Talesnick | 313/508 |
| 3,132,276 | 5/1964 | Yando | 313/508 |
| 3,249,804 | 5/1966 | Aiken | 358/241 |

FOREIGN PATENT DOCUMENTS

2308263 12/1976 France .

OTHER PUBLICATIONS

Luukkala et al, "Image Scanning by Acousto-Electro-Optic Interaction", *Electronics Letters*, 21 Mar. 1974, vol. 10, No. 6, pp. 80–81.
Moll et al., "Scanning Optical Patterns with Acoustic Surface Waves", *Journal De Physique*, Colloque C6, supplement on No. 11–12, Tome 33, Nov.–Dec. 1972, p. 231.
Takada, "Surface-Wave Acoustoelectric Image Scanner", *Appl. Phys. Lett.*, vol. 23, No. 8, 15 Oct. 1973, pp. 415–416.
Gautier et al, "Acoustic Transform Techniques Applied to Optical Imaging", Microwave Laboratory, Stanford University, Stanford, California, pp. 99–103, (name of publication and date not known).
Dobrovol'skii et al, "Interaction of Surface Acoustic Waves in a Phosphor-Bearing Piezoelectric: A New Method for Exciting Electroluminescence", *Sov. Tech. Phys. Lett.*, 4(7), Jul. 1978, pp. 303–304, copy in 313–508.
Dobrovolsky et al, "Non-Linear Acoustoelectroluminescence", *Electronics Letters*, vol. 16, No. 1, Jun. 3, 1980, pp. 37, 38.

*Primary Examiner*—Tommy P. Chin
*Attorney, Agent, or Firm*—Laff, Whitesel, Conte & Saret

[57] ABSTRACT

A flat screen display system uses a two-dimension surface acoustic wave ("SAW") scanning. The flat screen is made of a piezoelectric substrate coated with a layer of piezoluminophor powder. Four SAWs having two by two nonparallel directions are launched along the piezoelectric surface. The first of the two SAWs is pulsed and the third one has a constant amplitude. The fourth SAW is modulated by the information to be displayed. With respect to the modulated SAW, the pulsed SAWs are launched with a delay that is determined by the distance to be covered by the modulated SAW, for reaching the point which the current modulation corresponds to.

3 Claims, 5 Drawing Figures

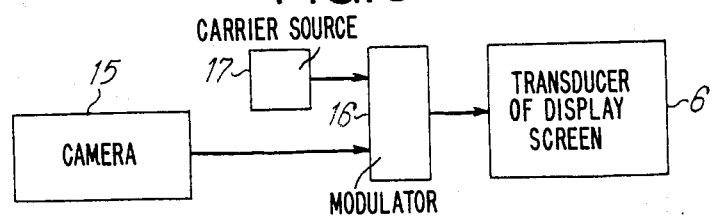
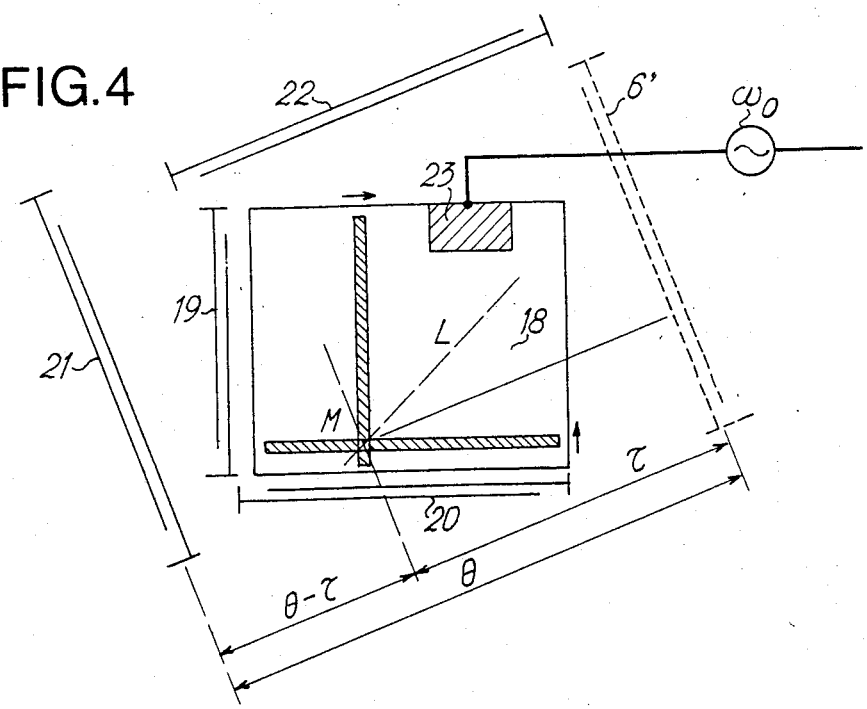

FLAT SCREEN DISPLAY SYSTEM USING A TWO-DIMENSION SURFACE ACOUSTIC WAVE (SAW) SCANNING

This is a continuation of U.S. patent application Ser. No. 277,212, filed June 25, 1981, now abandoned.

The present invention relates to a flat screen display system using a two-dimension surface acoustic wave (SAW) scanning.

In the French published patent No. 2,308,263 filed by the applicants, there is described a two-dimension scanning process for scanning a picture projected upon a semiconductor film, the scanning process making use of three surface acoustic waves launched at the surface of a piezoelectric substrate lying under the semiconductor film, the respective directions of the three SAWs being not two by two parallel. The three SAWs interacting non linearly at the points where they are phased produce a surface acoustic wave whose frequency is the sum of the three initial SAW frequencies and amplitude varies as the light impinging those points of the semiconductor film. Embodying a camera along that process makes use of signal generators that apply to respective transducers signals needed to generate the three initial SAWs and an output circuit tuned at the interaction signal frequency and coupled across a pair of electrodes, one being above and the other under the piezoelectric substrate.

In the technical article entitled "Nonlinear acousto-electroluminescence" by A. B. Sherman, A. A. Dobrovolsky and V. V. Lemanov, issued in the technical review "ELECTRONICS LETTERS" of Jan. 3, 1980, Vol. 16, No. 1, Pages 37 and 38, there is described the interaction of an surface acoustic wave propagating along the surface of a piezoelectric material on which a layer of powder of electroluminophore material is deposited. The dependence of brightness of luminescence on SAW amplitude manifests high non linearity. As a result, the luminescence response may be modulated by frequencies which are harmonics of the SAW frequencies. Moreover, since the brightness is a function of the modulus of the exciting SAW field, those frequencies must be even harmonics.

In experiments described in the above mentioned technical article, lithium niobate (LiNbO$_3$) substrate was usually used as piezoelectric material and gallium phosphide or silicium carbide were used as luminophor powders.

A purpose of the present invention is to provide a display system for a two-dimension screen which makes use of SAW scanning process derived of that described in the already mentioned French patent No. 2,308,263 and an interaction between the scanning SAWs and a nonlinear luminophor powder.

According to a feature of this invention, there is provided a flat screen display system wherein the flat screen is made of a piezoelectric substrate coated with a layer of piezoluminophor powder, four SAWs having two by two nonparallel directions being launched along the piezolelectric surface, the first two SAWs being pulsed, the third one having a constant amplitude and the fourth one being modulated by the information to be displayed, the pulsed SAWs being with respect to the modulated SAW launched with a delay that is determined by the distance to be covered by the modulated SAW for reaching the point which the current modulation corresponds to.

According to another feature, the modulus of the fourth modulated SAW is so selected that the signal resulting from the interaction of the four SAWs at the point to be displayed is in the most favourable portion of the luminescence characteristics of the piezoluminophor powder.

According to another feature, the display screen is made of three elementary screens made of transparent substrates whose piezoluminophor powders respectively emit different basic colors.

According to another feature, the piezoluminophor powder layer is divided into adjacent groups of the three powder lines whose compositions respectively correspond to the transmission of the three basic colors.

According to another feature, the display system is supplemented by a device under the form of a flat camera made of a piezoelectric substrate coated with electrodes whereon three SAWs are launched that have angular frequencies and directions respectively corresponding to the first three SAWs used in the display screen, a signal having an angular frequency equal to the sum of the angular frequencies of the four display screen SAWs being applied to the said electrodes, the produced SAW resulting from the interaction of the three camera SAWs and the electrode signal being collected by an appropriate receiver transducer whose output is applied, after having been modulated by the information, to the screen transducer launching the fourth modulated SAW.

To be noted that such a device would permit in another application to designate a point of the picture so as to measure its coordinates and thus obtain an interactive screen.

Figure 2:
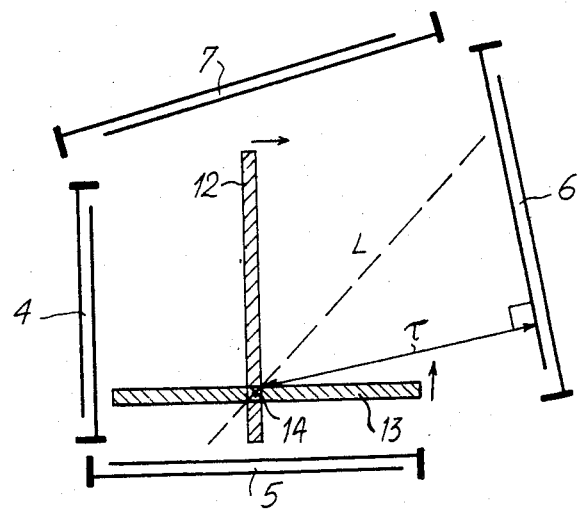
Figure 5:
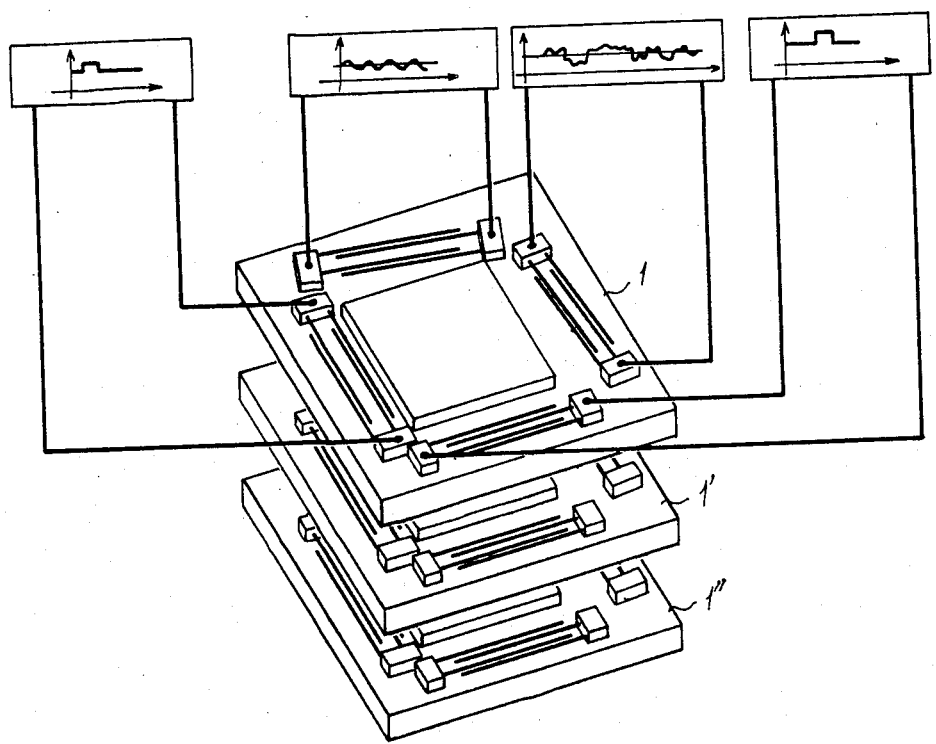

The above mentioned features of the invention, as well as others, will appear more clearly from the following description of embodiments, the said description being made in conjunction with the accompanying drawings, wherein:

FIG. 1 is a schematic perspective view of a flat screen display system according to this invention, FIG. 2 is a more schematic view illustrating how surface acoustic waves interact along the surface of the screen shown in FIG. 1, FIG. 3 is a block diagram of a display system comprising the display screen shown in FIG. 1, FIG. 4 is a schematic view of a device for generating the advance needed by the modulator of the system shown in FIG. 3, and FIG. 5 is a schematic view of a trichromatic display system according to this invention.

The display system shown in FIG. 1 comprises a flat screen 1 that is made of a piezoelectric substrate 2 on the surface of which piezoluminophor powder 3 has been deposited. On the surface of substrate 2, round the piezoluminophor powder layer 3, four transducers 4–7 are arranged which can in a conventional manner transmit surface acoustic waves (SAWs) in the same directions as their respective normal lines or close to those directions when the piezoelectric material is an anisotropic material.

Transducers 4 and 5 are usually perpendicular to each other while transducers 6 and 7 are oriented in any directions, with the only condition that those directions are not parallel either to transducer 4 or 5, or to each other. Lengths of transducers 4–7 are such that the widths of the tracks along which SAWs are launched cover the useful surface of the display screen. Input terminals of transducers 4–7 are respectively connected from outs of signal generators 8–11.

More particularly, in the hereby described embodiment, material of substrate 2 is isotropic, as a glass or better a piezoelectric ceramic, or still a piezoelectric plastic material, or it is anisotropic as a piezoelectric crystal, such as a quartz crystal, a crystal of lithium niobate, $AlPO_4$, $Bi_{12}GeO_{20}$, or $Bi_{12}SeO_{20}$.

The piezoluminophor layer 3 may be made of gallium phosphide or silicium carbide, or any other phosphides used in the television technical field.

With reference to FIG. 2 that represent only schematically the surface of substrate 2, generator 8 delivers to transducer 4 a pulsed signal of angular frequency $\omega_1$ and recurrence period T, generator 9 delivers to transducer 5 a pulsed signal of angular frequency $\omega_2$ and a slightly different recurrence period $(T+\Delta T)$, generator 11 delivers to transducer 7 a constant amplitude signal of angular frequency $\omega_4$, and generator 10 delivers to transducer 6 a signal having an amplitude modulated by the information and an angular frequency $\omega_3$. The pulses delivered from generators 8 and 9 have the same width.

In FIG. 2, assumption is made that pulses 12 and 13 have been transmitted at the same time by transducers 4 and 5. Thus, at time t, in an elementary area 14 that is approximately on the bisector of the angle formed by transducers 4 and 5, there is an interaction of pulses of angular frequency $\omega_1$ and $\omega_2$, as well as with the continuous wave, not shown, of angular frequency $\omega_3$ transmitted by 6 and the continuous wave, not shown, of angular frequency $\omega_4$ transmitted by transducers 7. The resulting interaction signal has an angular frequency $\omega_0$ which satisfies to the following equation:

$$\omega_0 = \omega_1 + \omega_2 + \omega_3 + \omega_4 \quad (1)$$

Designating the propagation directions of waves transmitted by transducers 4, 5 and 6 by $\vec{a_1}$, $\vec{a_2}$ and $\vec{a_3}$, with $\vec{a_1}$ normal to $\vec{a_2}$, the vector $\vec{k_4}$, that results from the following equation:

$$\vec{k_4} = -(\omega_1 \vec{a_1} + \omega_2 \vec{a_2} + \omega_3 \vec{a_3}) \quad (2)$$

defines the direction $\vec{a_4}$ and the angular frequency $\omega_4$ of the wave to be transmitted by transducers 7 in accordance with the following equation:

$$\omega_4 = \vec{k_4}/\vec{a_4} \quad (3)$$

Designating by $A_1$, $A_2$, $A_3$ and $A_4$ the amplitudes of the waves respectively transmitted by transducers 4–7, where $A_1$ and $A_2$ are pulse amplitudes, $A_4$ a constant amplitude and $A_3$ a modulated amplitude, the point 14, that is being scanned at time t, has an elastic amplitude A:

$$A = A_1 + A_2 + A_3(t-\tau) + A_4 \quad (4)$$

while any other point has an elastic amplitude $A_1+A_3+A_4$, or $A_2+A_3+A_4$, or nil. In the above equation, $\tau$ is the delay due to the wave propagation duration between transducer 6 and point 14. When the response of the piezoluminophor powder 3 is considerably nonlinear, the luminescence of other points than the scanned point 14 is negligible. On the contrary, angular frequency of wave $\omega_4$ is so selected that the luminescence of the scanned point is the most favourable.

Obviously the point 14 is moving along the line L as a function of time t. Moreover, the time shift between recurrent pulses respectively transmitted from transducers 4 and 5 varies from a period to the next one which causes line L to shift. The period of pulses from transducer 5 is for instance a little longer, with $\Delta T$ being positive, than those from transducer 4. Thus, for the period following the simultaneous pulse transmission as hereabover described, the pulse transmission from transducer 5 will be slightly delayed with respect to pulse transmission from transducer 4. Therefore, at that next period, the interaction area 14 will described a line parallel to L, but slightly shifted to the right. As a result, the useful surface of the screen is scanned by successive lines. The period difference $\Delta T$ defines the scanning definition, that is the number of lines per picture.

As hereabove described, the luminescence to be generated at tile t on point 14 results from amplitude $A_3$ of the wave launched from transducer 6 at time $(t-\tau)$. Thus the advance to be applied to the modulation must be determined with respect to the slowness of the wave launched from transducer 6 and the position of the scanned point. Of course, the advance amount may be determined by a delay computer means the input of which receives the modulation in advance, with a fixed period of time, and wherein the computation parameters are defined by the slowness of the wave launched from transducer 6 and the relative scanning speed of point 14 with respect to transducer 6. However, the advance determination may be produced by simple analog means, as it will be described in conjunction with FIG. 3.

FIG. 3 shows the block diagram of a complete display system according to this invention. A camera device 15, similar to the camera described in French patent No. 2 308 263, has an output connected to the carrier input of a modulator 16 whose second input is connected from modulation signal source 17. The output of modulator 16 is connected to the transducer 6 of the screen 1 (FIG. 1).

FIG. 4 schematically shows the surface of the substrate 18 of camera 15, on which four transducers 19–22 are provided. Above and under the substrate 18 electrodes are provided, one of those electrodes being partly shown at 23. Transducers 19, 20 and 22 occupy, on substrate 18, the same relative positions as transducers 4, 5 and 7 on substrate 2 of the screen 1. At 6', FIG. 4, there is shown the position which corresponds to position of transducer 6 on substrate 2. The transducer 21 is arranged parallel to 6', but on the other side of the active area of 18 with respect to 6'.

Transducers 19, 20 and 22 are respectively connected to signal sources having the respective angular frequencies $\omega_1$, $\omega_2$ and $\omega_4$. Electrodes 23 are conected from output terminals of a source having an angular frequency of $\omega_0$, as defined by equation (1).

The sources, not shown, that drive transducers 19 and 20 operate in a pulse mode in synchronism with sources 8 and 9. The sources, nt shown, that drive transducer 22 and electrodes 23 operate in continuous mode.

The camera scanning is produces by both transducers 19 and 20 along a line L corresponding to line L, FIG. 2. Resulting from transmission from 22 and signal of angular frequency $\omega_0$ applied to electrode 23, there is a phase matching at the scanned point M which will retransmit backward, that is to transducer 21 with an angular frequency $\omega_3$. The wave collected by transducer 21 is delayed by a delay $(\theta-\tau)$, where $\theta$ is the constant propagation time from position 6' to transducer 21.

The signal collected by transducer 21 is modulated in modulator 16 (FIG. 3) by the signal which is to be displayed on the screen 1 and the so the modulated signal is applied to transducer 6.

Considering point M, that is scanned at time t, the signal collected by transducer 21 at the time t corresponds to the signal of the point that was scanned at time $(t+\theta-\tau)$. If output signals from pulsed sources 8 and 9 are delayed by $\theta$, the corresponding point M in screen 1 (FIG. 1) is scanned at time $(t+\theta)$.

In other words, transducer 6 is launching a signal at time $(t+\theta-\tau)$ for a point to be scanned at time $(t+\theta)$, that is exactly with the desired advance $\tau$.

The schematic perspective view of FIG. 5 shows how by superposing three screens 1, 1' and 1" according to this invention, the substrates of those screens being transparent and their respective piezoluminophor layers emitting in the three basic colors, a color display screen may be produced. Of course, in that case a single camera is needed to produce the required advance information to be applied to the transducers 6 of each of the three superposed screens.

According to this invention, it is also possible to deposit onto the screen substrate surface a pattern of piezoluminophor lines organized in groups of three lines respectively corresponding to the three basic colors. Then a modulation source 10 is provided which can deliver the modulation as a function of the current scanned color line. Of course, the line pattern is parallel to the scanning direction.

To be noted that, when the screen of FIG. 1 is superposed over the camera of FIG. 4, the result is an interactive screen, that is a device for designating a point of the picture so as to measure its coordinates. In this case, the modulation signal is directly produced by the item designating the point and the camera surface.

What is claimed is:

1. A flat, two-dimensional, surface acoustical wave (SAW) display screen comprising a piezoelectric substrate having a flat surface with a coating layer of piezoluminophor powder distributed over at least a part of said surface, four elongated SAW transducers means mounted on said surface of said substrate at non-parallel locations which generally enclose said coating layer, a first pair of said transducer means being generally perpendicular to each other, means for individually pulsing said first pair transducer means to develop a scan across said coating layer, means for applying a constant amplitude signal to a third of said transducer means, means for applying a modulated information signal to a fourth of said transducer means, and means for operating said pulsing means with a delay between pulses applied to said first two perpendicular pair of transducer means, said delay corresponding to the distance to be covered by the SAW carrying said modulated information signal, whereby the information contained in said modulation may be displayed at a specific point where surfaces wave launched by said transducer means coincide.

2. System of claim 1, wherein the modulus of the fourth modulated SAW causes the signal resulting from the interaction of the four SAWs to be displayed at a point which is in the most favorable portion of the luminescence characteristics of the piezoluminophor powder.

3. The system of claim 1 or 2 and camera means having a flat plate comprising a piezolelectric substrate having an electrode coating thereon, and three SAW transducer means having angular frequencies and directions corresponding to the frequencies and directions of the SAWs of the first to third transducer means of said display screen, means for applying to the three transducer means of said camera a signal having an angular frequency equal to the sum of the angular frequencies of the four SAWs of said display screen, receiver transducer means for collecting the resulting surface acoustical waves produced on said camera flat plate by said three transducer means, and means responsive to said receiver transducer means for modulating the information signal applied to said fourth of said SAWs of said display screen.

* * * * *